US006912362B1

(12) United States Patent
Takiguchi et al.

(10) Patent No.: US 6,912,362 B1
(45) Date of Patent: Jun. 28, 2005

(54) DISPERSION SLOPE EQUALIZER

(75) Inventors: Koichi Takiguchi, Mito (JP); Katsunari Okamoto, Mito (JP); Takashi Goh, Mito (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 492 days.

(21) Appl. No.: 09/688,933

(22) Filed: Oct. 17, 2000

(30) Foreign Application Priority Data

Oct. 19, 1999 (JP) .......................................... 11-296877

(51) Int. Cl.[7] .............................................. H04B 10/00
(52) U.S. Cl. ...................... 398/158; 398/147; 398/148; 398/79; 398/81; 398/84; 398/87; 398/141; 398/159; 385/24; 385/37
(58) Field of Search ................................ 398/147, 158, 398/148, 79, 141, 159, 81, 84, 87, 82; 385/24, 37

(56) References Cited

U.S. PATENT DOCUMENTS

| 5,572,611 A | * | 11/1996 | Jinguji et al. ................. 385/17 |
| 6,137,604 A | * | 10/2000 | Bergano ......................... 398/1 |
| 6,181,449 B1 | * | 1/2001 | Taga et al. ...................... 398/9 |

FOREIGN PATENT DOCUMENTS

| EP | 0 657 754 A1 | 6/1995 |
| EP | 0 884 867 A2 | 12/1998 |
| JP | 05-011226 | 1/1993 |
| JP | 05-303019 | 11/1993 |
| JP | 05-346515 | 12/1993 |
| JP | 06331842 | 12/1994 |
| JP | 07-098424 | 4/1995 |
| JP | 07104137 | 4/1995 |
| JP | 09-133609 | 5/1997 |
| JP | 09-133825 | 5/1997 |
| JP | 09133825 | 5/1997 |
| JP | 10-093506 | 4/1998 |
| WO | WO 99/45420 A1 | 9/1999 |

OTHER PUBLICATIONS

Koji Sasayama et al., "Coherent Optical Transversal Filter Using Silica–Based Waveguides for High–Speed Signal Processing," Journal of Lightwave Technology, vol. 9, No. 10, pp. 1225–1230, Oct. 1991.

(Continued)

Primary Examiner—Hanh Phan
(74) Attorney, Agent, or Firm—Venable LLP; Michael A. Sartori

(57) ABSTRACT

The object of the present invention is to provide a compact dispersion slope equalizer by which it is possible to simultaneously recover distorted waveforms of WDM signals by dispersion slope of DSF or NZ-DSF at 1.55 $\mu$m band, and to compensate for the dispersion of various fiber transmission lines having various dispersion values and variation of dispersion value caused by the temperature change or the like. WDM signals distorted by the dispersion slope of the fiber are introduced into an input waveguide, and are demultiplexed by a wavelength demultiplexer into each wavelength component, and pass through lattice-form optical circuits, transversal-form optical circuits, or the combination of these circuits. The dispersion slope of the signals is compensated for by these circuits. The recovered signals are multiplexed by a wavelength multiplexer, and the multiplexed light is outputted at an output waveguide. Arrayed-waveguide gratings can be used as the wavelength demultiplexer and multiplexer. Also, cascaded configuration of Mach-Zehnder interferometers, bulk-type optical filters, or fiber-type (or waveguide-type) gratings in series can also be used as the wavelength demultiplexer and multiplexer.

12 Claims, 21 Drawing Sheets

OTHER PUBLICATIONS

Koichi Takiguchi et al., "Integrated–Optic Dispersion Slope Equalizer For N +40 Gb/s WDM Transmission", Sep. 3, 2000.

Koichi, Takiguchi et al., "Dispersion Compensation Using a Planar Lightwave Circuit Optical Equalizer", IEEE Photonics Technology Letters, vol. 6, No. 4, Apr. 1994, pp. 561–564.

Koichi, Takiguchi et al., "Planar Lightwave Circuit Optical Dispersion Equalizer", Proceedings of the European Conference on Optical Communication (ECOC) Montreux, vol. 3, Sep. 12, 1993, pp. 33–36.

Koichi, Takiguchi et al., "Variable group–delay dispersion equaliser based on a lattice–form programmable optical filter", Electronics Letters, vol. 31, No. 15, Jul. 20, 1995, pp. 1240–1241.

Koichi, Takiguchi et al., "Dispersion Slope Equalizer for Dispersion Shifted Fiber Using a Lattice–Form Programmable Optical Filter on a Planar Lightwave Circuit", Journal of Lightwave Technology, vol. 16, No. 9, Sep. 1998, pp. 1647–1656.

MacDonald, R. I., "Optoelectronic Equalisation", IEEE Photonics Technology Letters, vol. 6, No. 4, Apr. 1994, pp. 565–567.

* cited by examiner

DISPERSION SLOPE EQUALIZER

This application is based on Patent Application No. 11-296877(1999) filed Oct. 19, 1999 in Japan, the content of which is incorporated hereinto by reference.

BACKGROUND OF THE INVENTION

1. Field of the Invention

The present invention is on a dispersion slope equalizer that simultaneously recovers waveforms of wavelength division multiplexed (WDM) signals distorted by dispersion characteristic (that is; group delay is different at each wavelength) in an optical fiber.

2. Description of the Related Art

Today, the investigation to achieve a large capacity optical transmission systems is being actively carried out utilizing a dispersion shifted fiber (DSF) having zero dispersion or a non-zero dispersion shifted fiber (NZ-DSF) having several psec/nm/km dispersion at wavelength $\lambda=1.55$ $\mu$m band.

However, when WDM transmission using DSF's is carried out in order to realize large capacity networks, second-order dispersion (derivative of group delay with respect to wavelength) is different at each wavelength channel as shown in FIG. 20 (relative delay time characteristics of DSF). This dispersion difference is caused by dispersion slope, namely, third-order dispersion (derivative of second-order dispersion with respect to wavelength), whose typical value is about 0.07 psec/nm$^2$/km. As a result, the signal pulse at each wavelength channel is differently distorted, which limits the transmission capacity or propagation distance (distance between repeaters). This is also the same as when NZ-DSF is used.

Up to now, configuration in FIG. 21 has been known as a dispersion slope equalizer, which recovers the distorted waveforms of WDM signals by the dispersion in fibers. In FIG. 21, dispersion compensating fiber (DCF) 44 is set behind fiber transmission line 43. In this configuration, dispersion characteristic in the fiber transmission line can be compensated by the DCF, whose dispersion has the same absolute value with opposite sign to that of the fiber transmission line.

However, the prior art dispersion slope equalizer having the foregoing configuration has following problems:
(1) by utilizing the foregoing configuration, it is possible to compensate for dispersion slope of a 1.3 $\mu$m band zero dispersion fiber (that is; single mode fiber (SMF)) at 1.55 $\mu$m band, but it is impossible to compensate for dispersion slope of DSF or NZ-DSF at 1.55 $\mu$m band,
(2) configuration is complicated and the size is large, and
(3) compensation value is fixed, and it is impossible to compensate for the dispersion of various fiber transmission lines having various dispersion values and variation of dispersion value caused by the temperature change or the like by utilizing the foregoing configuration.

SUMMARY OF THE INVENTION

Considering the foregoing problems, an object of the present invention is to provide a compact dispersion slope equalizer by which it is possible to simultaneously recover distorted waveforms of WDM signals by dispersion slope of DSF or NZ-DSF at 1.55 $\mu$m band, and to compensate for the dispersion of various fiber transmission lines having various dispersion values and variation of dispersion value caused by the temperature change or the like. This configuration comprises group delay controllers comprising lattice-form optical circuits, transversal-form optical circuits, or the combination of these two circuits.

To realize the foregoing object, according to a 1st aspect of the present invention, there is provided a dispersion slope equalizer for compensating signal distortion caused by dispersion slope of a transmission line when transmitting lightwaves with plural wavelength signals in the transmission line characterized by comprising: N (N: natural number) waveguides, N output wavelength demultiplexer and/or N input wavelength multiplexer, and K (K: natural number, K$\leq$N) group delay controllers; the N waveguides being connected to outputs of the wavelength demultiplexer and/or inputs of the wavelength multiplexer; in the group delay controllers, one or both of input/output parts of lattice-form optical circuits being set on the N waveguides; wherein the lattice-form optical circuits are composed of two waveguides interleaved with at least two directional couplers, and the two waveguides are designed so that optical path lengths between the directional couplers are different.

According to a 2nd aspect of the invention, the wavelength demultiplexer and the wavelength multiplexer are arrayed-waveguide gratings.

According to a 3rd aspect of the invention, the group delay controllers are connected to N input wavelength multiplexer and the N waveguides are connected to only inputs of the wavelength multiplexer.

According to a 4th aspect of the invention, the wavelength multiplexer is an arrayed-waveguide grating.

According to a 5th aspect of the invention, the group delay controllers are connected to N output wavelength demultiplexer and the N waveguides are connected to only outputs of the wavelength demultiplexer.

According to a 6th aspect of the invention, the wavelength demultiplexer is an arrayed-waveguide grating.

According to a 7th aspect of the invention, the group delay controllers are composed of the combination of the lattice-form and transversal-form optical circuits.

According to an 8th aspect of the invention, there is provided a dispersion slope equalizer for compensating signal distortion caused by dispersion slope of a transmission line when transmitting lightwaves with plural wavelength signals in the transmission line characterized by comprising: N (N: natural number) waveguides, N output wavelength demultiplexer and/or N input wavelength multiplexer, and N group delay controllers; the N waveguides being connected to outputs of the wavelength demultiplexer and/or inputs of the wavelength multiplexer; in the group delay controllers, one of inputs and an output of transversal-form optical circuits being set on the N waveguides; wherein the transversal-form optical circuit is provided with first waveguide for one of inputs and M (M: natural number, M$\geq$2) directional couplers for coupling M waveguides with the first waveguide at M different positions, and the M waveguides, after being coupled with the first waveguide, are multiplexed by a multiplexer into second output waveguide.

According to a 9th aspect of the invention, the wavelength demultiplexer and the wavelength multiplexer are arrayed-waveguide gratings.

According to a 10th aspect of the invention, the group delay controllers are connected to N input wavelength multiplexer and the N waveguides are connected to only inputs of the wavelength multiplexer.

According to an 11th aspect of the invention, the wavelength multiplexer is an arrayed-waveguide grating.

According to a 12th aspect of the invention, the group delay controllers are connected to N outputs wavelength demultiplexer and the N waveguides are connected to only outputs of the wavelength demultiplexer.

According to a 13th aspect of the invention, the wavelength demultiplexer is an arrayed-waveguide grating.

According to a 14th aspect of the invention, the group delay controllers are composed of the combination of the transversal-form and lattice-form optical circuits.

The dispersion slope equalizer according to the present invention comprises integrated-optic components, that is; a wavelength demultiplexer and/or a wavelength multiplexer and a lattice-form optical circuit and/or a transversal-form optical circuit. By using this compact configuration, it is possible to compensate for the dispersion of various fiber transmission lines having various dispersion values and variation of dispersion value caused by the temperature change or the like, and to simultaneously recover distorted waveforms of WDM signals by dispersion slope of DSF or NZ-DSF at 1.55 µm band.

The foregoing and other objects, effects, features and advantages in the present invention will become more apparent by showing the following description of embodiments with the accompanying drawings.

DETAILED DESCRIPTION OF PREFERRED EMBODIMENTS (First Embodiment)

Figure 1:
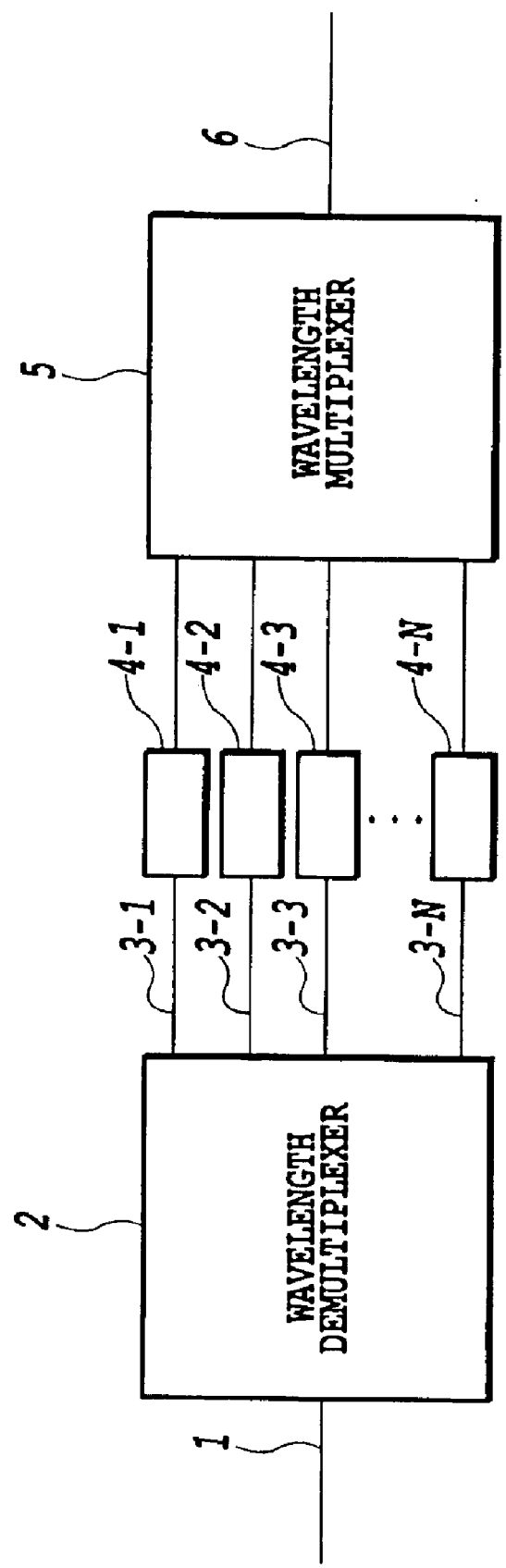
FIG. 1 is a diagram showing the configuration of a first embodiment of the dispersion slope equalizer according to the present invention.

FIG. 1 is a diagram showing the configuration of a first embodiment of the dispersion slope equalizer according to the present invention;

In FIG. 1, the dispersion slope equalizer of the present embodiment comprises an input waveguide 1, a wavelength demultiplexer 2, waveguides 3-1 to 3-N, lattice-form optical circuits 4-1 to 4-N, a wavelength multiplexer 5, and an output waveguide 6.

WDM signal lightwaves λ1 to λN distorted by the dispersion slope are introduced into the input waveguide 1 and are demultiplexed by the wavelength demultiplexer 2 into wavelength components. Then, these wavelength components are introduced into the lattice-form optical circuits 4-1 to 4-N for dispersion slope compensation, and are multiplexed by the wavelength multiplexer 5. Finally, the multiplexed lightwaves are outputted at the output waveguide 6, thus achieving the dispersion slope equalizer.

The wavelength demultiplexer 2 and the wavelength multiplexer 5 can be composed of not only arrayed-waveguide gratings (described in detail later), but also cascaded configuration of Mach-Zehnder interferometers, bulk-type optical filters, or fiber-type (or waveguide-type) gratings in series.

Figure 2:
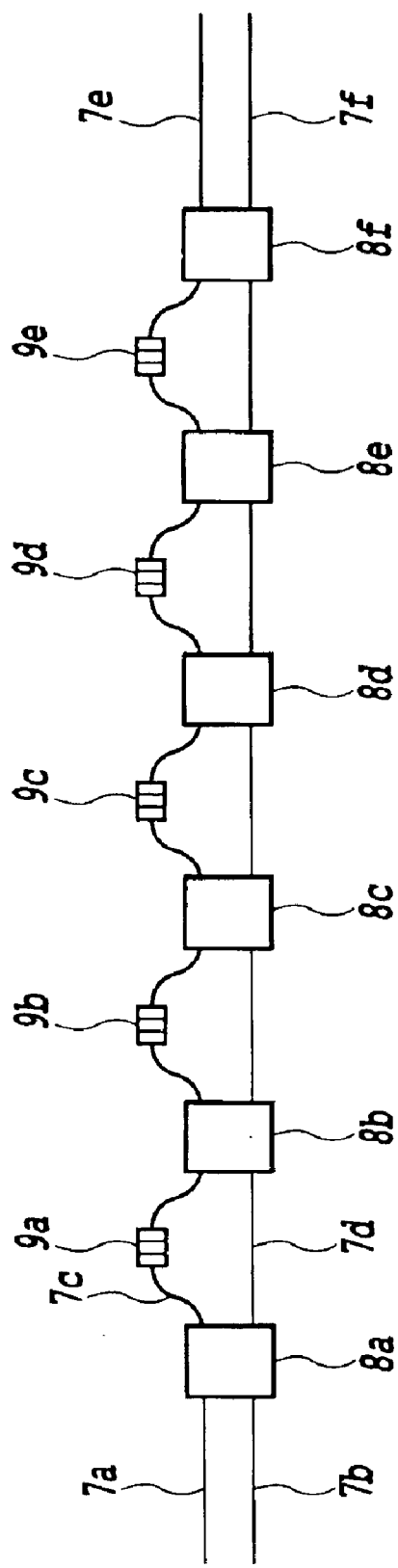
FIG. 2 is a diagram showing the configuration of a lattice-form optical circuit shown in FIG. 1.

FIG. 2 is a diagram showing a configuration example of the lattice-form optical circuits 4-1 to 4-N.

This lattice-form optical circuit has a configuration in which five asymmetrical arm pairs are cascaded in series by setting six directional couplers, that is; asymmetrical Mach-Zehnder interferometers are cascaded in series. In FIGS. 2, 7a to 7f are waveguides (waveguides 7a and 7b, and 7e and 7f are inputs and outputs, respectively), 8a to 8f are directional couplers, and 9a to 9e are control parts of waveguide refractive index.

Four lattice-form optical circuits 4-1 to 4-N in FIG. 1 are connected to one of waveguides 3-1 to 3-N by utilizing one of the waveguides 7a and 7b and one of the waveguides 7e and 7f.

The directional couplers 8a to 8f can have a configuration in which the two waveguides 10a and 10b are made approached each other, or a multi-mode interference (MMI)

coupler configuration. In this case, the coupling coefficient is fixed. By appropriately tuning waveguide phase in the control parts of waveguide refractive index 9a to 9e, it is possible to make higher frequency lightwaves pass through a longer or shorter optical path length in FIG. 2. Therefore, a dispersion equalizer can be achieved whose group delay increases or decreases with increase of frequency.

Figure 4:
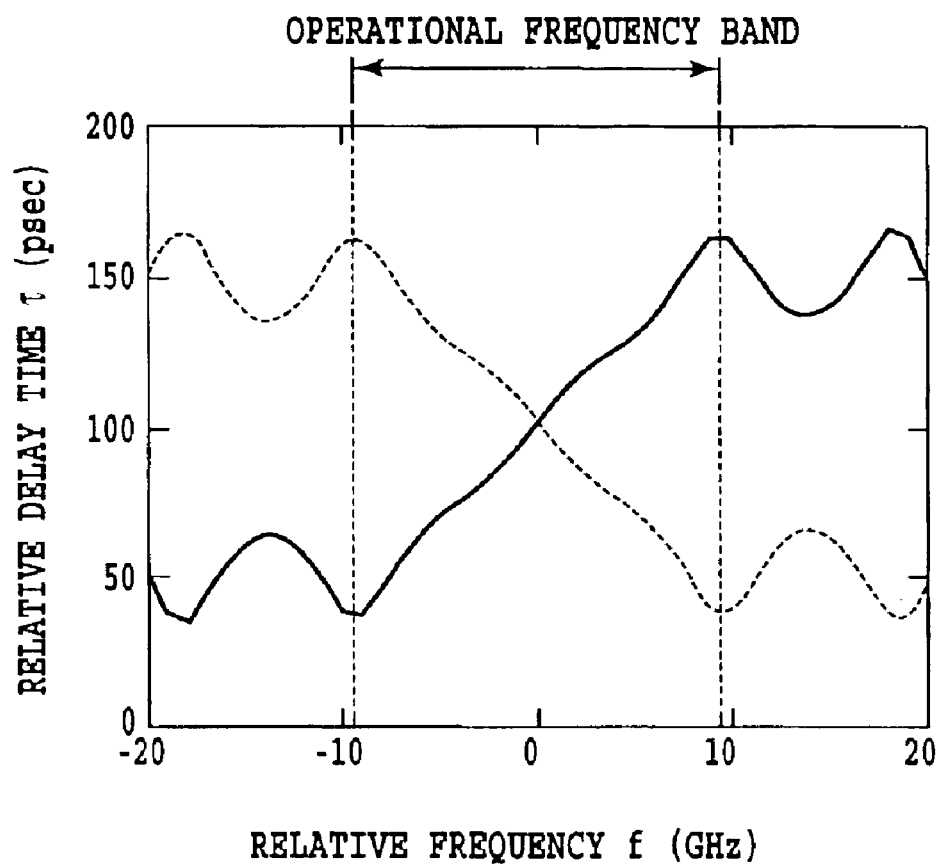
FIG. 4 is a diagram showing a calculated characteristic example of the lattice-form optical circuit shown in FIG. 2.

FIG. 4 is a diagram showing a calculated characteristic example of the lattice-form optical circuit shown in FIG. 2. Here, a delay time was derived by calculating a transfer function of the lattice-form optical circuit and obtaining the derivative of an imaginary part of the function with respect to an angular frequency.

This calculated example shows a case where optical path length differences of the asymmetrical Mach-Zehnder interferometers are 4.276 mm, 7.483 mm, 7.483 mm, 7.483 mm, and 3.207 mm in the direction of the right in FIG. 2, and a refractive index of the waveguide is 1.45.

The calculated result shows that the obtained dispersion values using the foregoing parameters are 830 psec/nm and −830 psec/nm.

A different dispersion value can be obtained by changing the optical path length differences of the asymmetrical Mach-Zehnder interferometers. When the optical path length difference is made L times, the operational bandwidth and the delay time is made 1/L and L times, respectively, then the dispersion value is made $L^2$ times.

Also, when the cascade number of the asymmetrical Mach-Zehnder interferometers is increased or decreased, absolute value of the dispersion can be increased or decreased, respectively. This is because that the delay time is increased or decreased by increasing or decreasing the total optical path length difference, respectively.

Thus, each lattice-form optical circuits 4-1 to 4-N can be designed so as to have a dispersion compensation value corresponding to each channel wavelength.

Control parts of waveguide refractive index 9a to 9e can be driven, for example, by using a thermo-optic or an electro-optic effect when using a glass or a dielectric waveguide, respectively. Also, when a glass waveguide is used, semipermanent phase shift can be achieved without electrical power, by applying a local heating and quenching with high electrical power for a photoelastic effect to the control parts of waveguide refractive index 9a to 9e. Thus, dispersion compensation can be achieved without electrical power using the configuration in FIG. 2 and, consequently, using that in FIG. 1.

Figure 5:
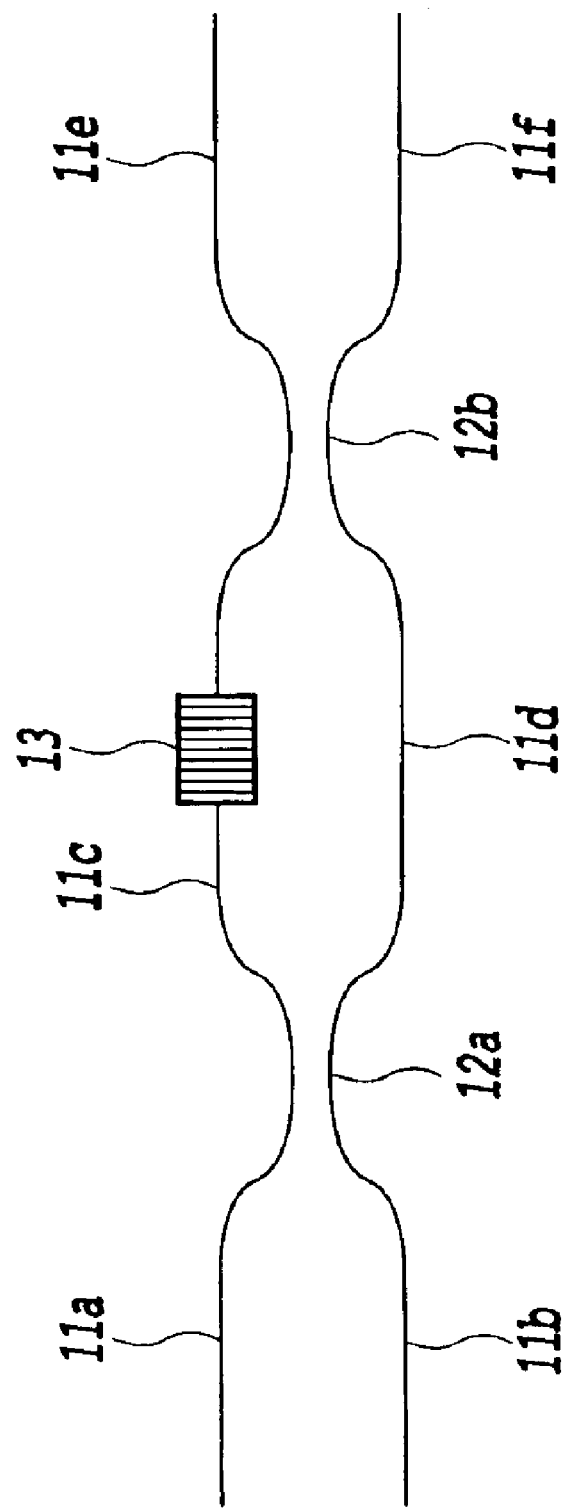
FIG. 5 is a diagram showing another configuration example of the directional coupler shown in FIG. 2.

FIG. 5 shows another configuration example of the directional couplers 8a to 8f in FIG. 2, which are composed of symmetrical Mach-Zehnder interferometer.

Numerals 11a to 11f, 12a and 12b, and 13 represent waveguides (waveguides 11a and 11b, and 11e and 11f are inputs and outputs, respectively), directional couplers (two waveguides are made approached each other), and a control part of waveguide refractive index, respectively. It is also possible to replace the directional couplers 12a and 12b with MMI-type couplers.

When the phase in control part of the waveguide refractive index 13 is changed from 0 to 2p, the coupling coefficient can be arbitrarily varied from 0 and 1 by utilizing the interferometer's switching characteristic. It is also possible to replace the single symmetrical Mach-Zehnder interferometer in FIG. 5 with Mach-Zehnder interferometers cascaded in series.

By appropriately tuning coupling coefficients of the directional couplers 8a to 8f and the waveguide phase in the control parts of waveguide refractive index 9a to 9e, it is possible to achieve a dispersion equalizer whose group delay can be varied to various values with both signs with respect to frequency.

Figure 6:
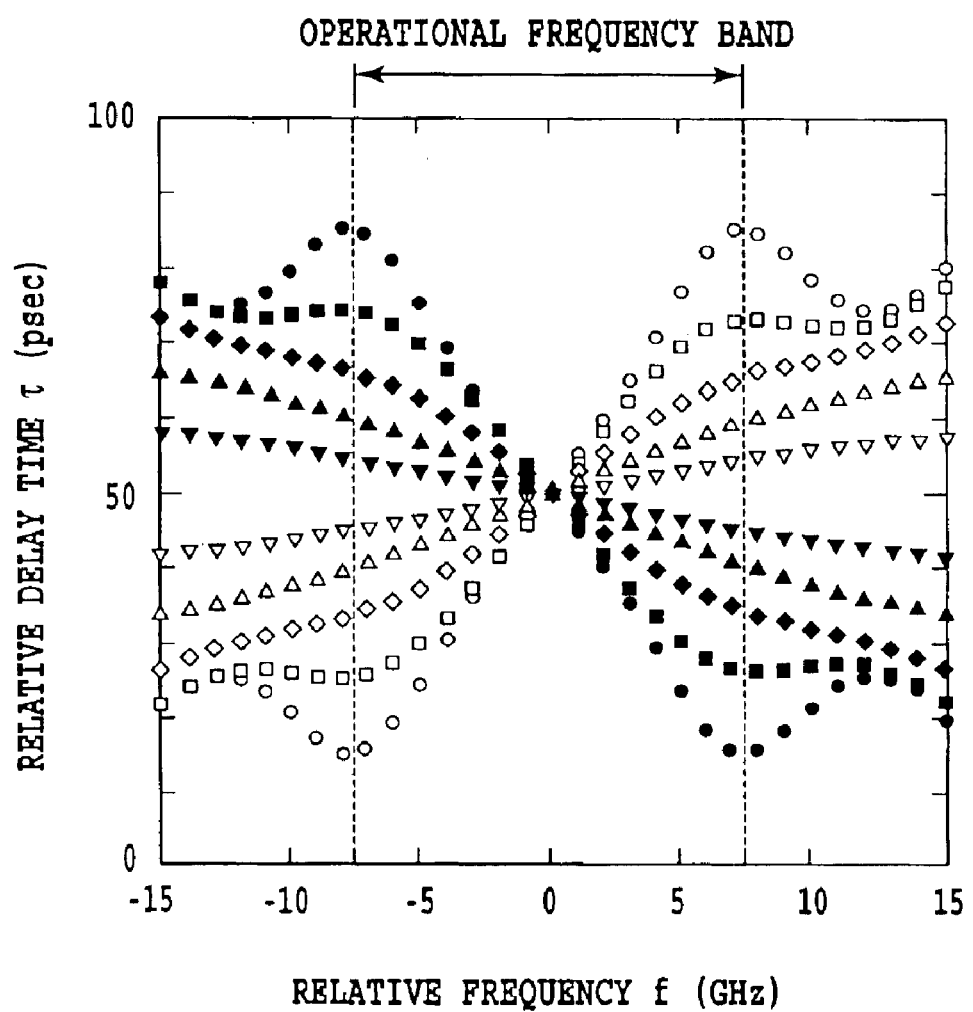
FIG. 6 is a diagram showing another calculated characteristic example of the lattice-form optical circuit shown in FIG. 2.

FIG. 6 is a diagram showing a calculated example of the group delay characteristic of the lattice-form optical circuit in FIG. 2 when the directional coupler in FIG. 5 is used.

Here, a case is shown where the number of the asymmetrical Mach-Zehnder interferometers is 6, optical path length differences in the all asymmetrical Mach-Zehnder interferometers are 2.759 mm, and waveguide refractive index is 1.45. Also in this case, a delay time was derived by calculating a transfer function of the lattice-form optical circuit and obtaining the derivative of an imaginary part of the function with respect to an angular frequency.

It is shown, by appropriately tuning coupling coefficients of the directional couplers 8a to 8f and the waveguide phase in the control parts of waveguide refractive index 9a to 9e, the arbitrary dispersion value ranging from −584 psec/nm to 584 psec/nm can be achieved using the foregoing parameters.

In this case, as the coupling coefficient of the directional coupler can be arbitrarily varied in the range of 0 to 1, dispersion of various values with both signs can be achieved. This is different from the case shown in FIG. 4 where the coupling coefficient of the directional coupler is fixed.

By using the directional couplers 8a to 8f in the configuration of FIG. 5, the lattice-form circuits 4-1 to 4-N having the following merits can be achieved. It is possible, by the single and compact circuit configuration, to adaptively compensate for the dispersion of various WDM signals, the dispersion of various fiber transmission lines having various dispersion values, and variation of dispersion value caused by the temperature change or the like.

Also as described before, when a glass waveguide is used, semipermanent phase shift can be achieved without electrical power, by carrying out a local heating and quenching with high electrical power for a photoelastic effect. Thus, dispersion compensation can be achieved without electrical power using the configuration in FIG. 2 and, consequently, using that in FIG. 1.

The configuration of the present embodiment in FIG. 1 can be used for the in-line dispersion slope equalizer. When the dispersion slope equalizer is set in front of the transmission line, it is not necessary to demultiplex the wavelength division multiplexed signals. In this case, various wavelength signals modulated by the data patterns are introduced into the waveguides 3-1 to 3-N, and are transmitted into the fiber after pre-dispersion slope compensation and wavelength multiplexing. Therefore, in such an application, the wavelength demultiplexer 2 can be omitted in FIG. 7.

On the other hand, when the dispersion slope equalizer is set behind the transmission line, it is not necessary to multiplex demultiplexed signals again. In this case, photo detectors are connected to just behind the lattice-form optical circuits 4-1 to 4-N. Therefore, in such an application, the wavelength multiplexer 5 can be omitted in FIG. 8.

Figure 7:
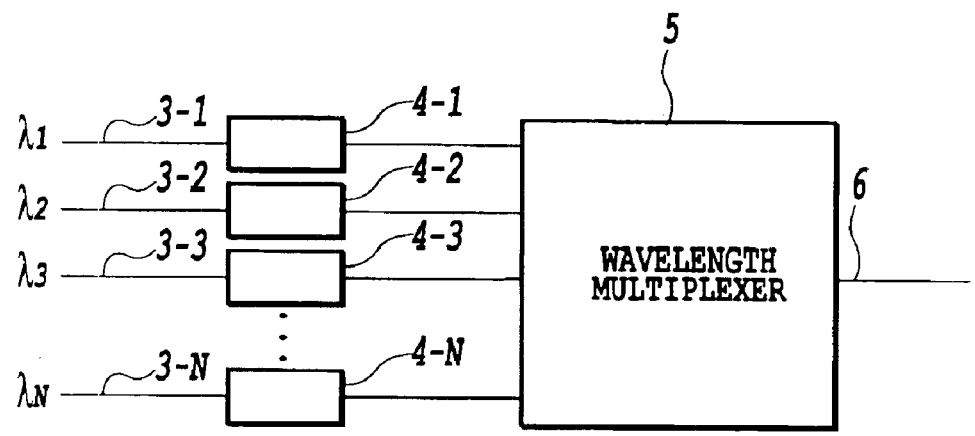
FIG. 7 is a diagram for explaining a case where the dispersion slope equalizer is set in front of a transmission line.
Figure 8:
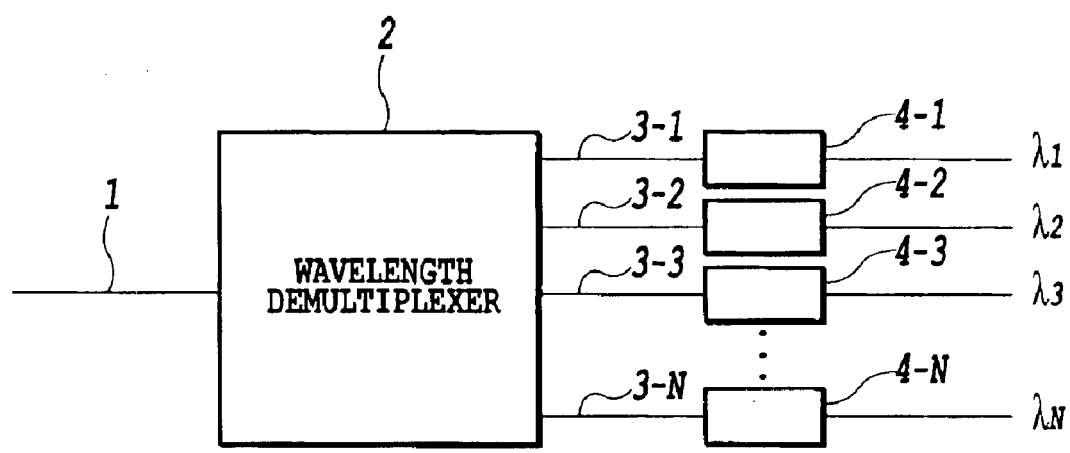
FIG. 8 is a diagram for explaining a case where the dispersion slope equalizer is set behind a transmission line.

The elements 4-1 to 4-N in FIGS. 1, 7, and 8 can be replaced with the combination of lattice-form and transversal-form optical circuits.

(Second Embodiment)

Figure 9:
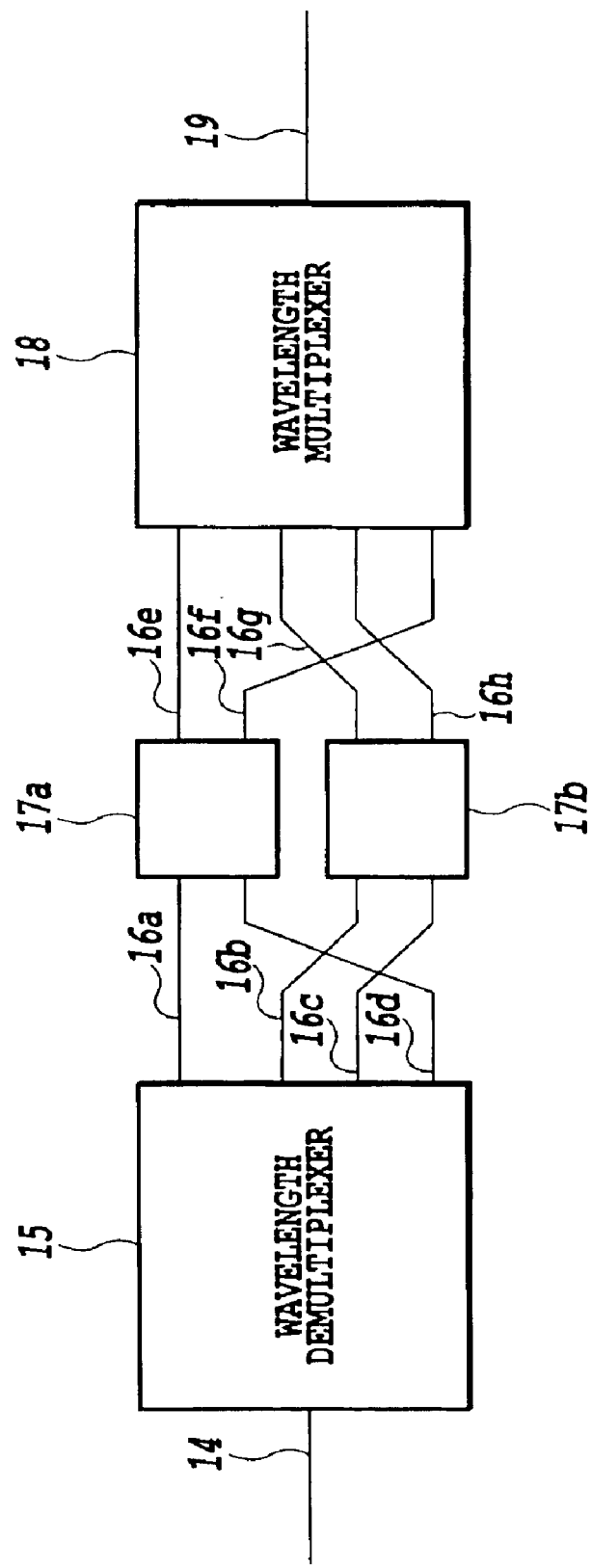
FIG. 9 is a diagram showing the configuration of a second embodiment of the dispersion slope equalizer according to the present invention.

FIG. 9 is a diagram showing the configuration of a second embodiment of the dispersion slope equalizer according to the present invention.

In FIG. 9, the dispersion slope equalizer of the present embodiment comprises an input waveguide 14, a wavelength demultiplexer 15, waveguides 16a to 16h, lattice-form optical circuits 17a and 17b, a wavelength multiplexer 18, and an output waveguide 19. Both of the waveguides 7a and 7b in FIG. 2 and two of the waveguides 16a to 16d, and both of the waveguides 7e and 7f and two of the waveguides 16e to 16h are connected.

In the lattice-form optical circuits in FIG. 2, it is confirmed that dispersion characteristic between two sets of input/output ports, for example, dispersion characteristics between the input waveguide 7a and the output waveguide 7e and between the input waveguide 7b and the output waveguide 7f have the same absolute value with opposite sign. This was confirmed because a transfer matrix of the lattice-form optical circuit shows unitary.

Figure 10:
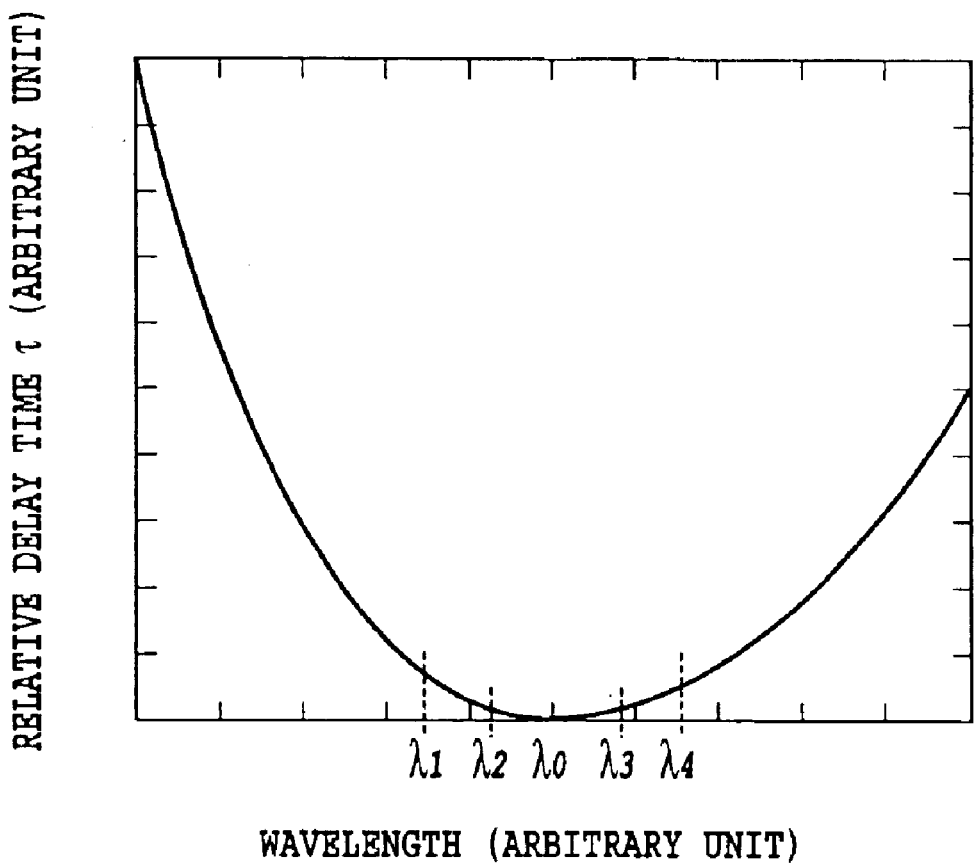
FIG. 10 is a diagram showing a group delay characteristic example of an optical fiber.

As shown in FIG. 10, wavelengths λ1 and λ4 or λ2 and λ3 are symmetrically set around the zero dispersion wavelength λ0. The dispersion values of λ1 and λ4 or λ2 and λ3 have the almost same absolute values with opposite sign each other. Therefore, one of two lattice-form optical circuits can be used for dispersion compensation of wavelength λ1 and λ4 signals, and the other for wavelength λ2 and λ3 signals.

When dispersion compensation for 4 wavelength signals is carried out, for example, the number of lattice-form optical circuits must be four in the configuration in FIG. 1, but its number can be cut down by half by using the configuration in FIG. 9.

By replacing one lattice-form optical circuit 17b with two transversal-form optical circuits, and connecting waveguide 16b, transversal-form optical circuit A, and waveguide 16g, and waveguide 16c, transversal-form optical circuit B, and waveguide 16h, the number of devices can be decreased to 3.

Figure 11:
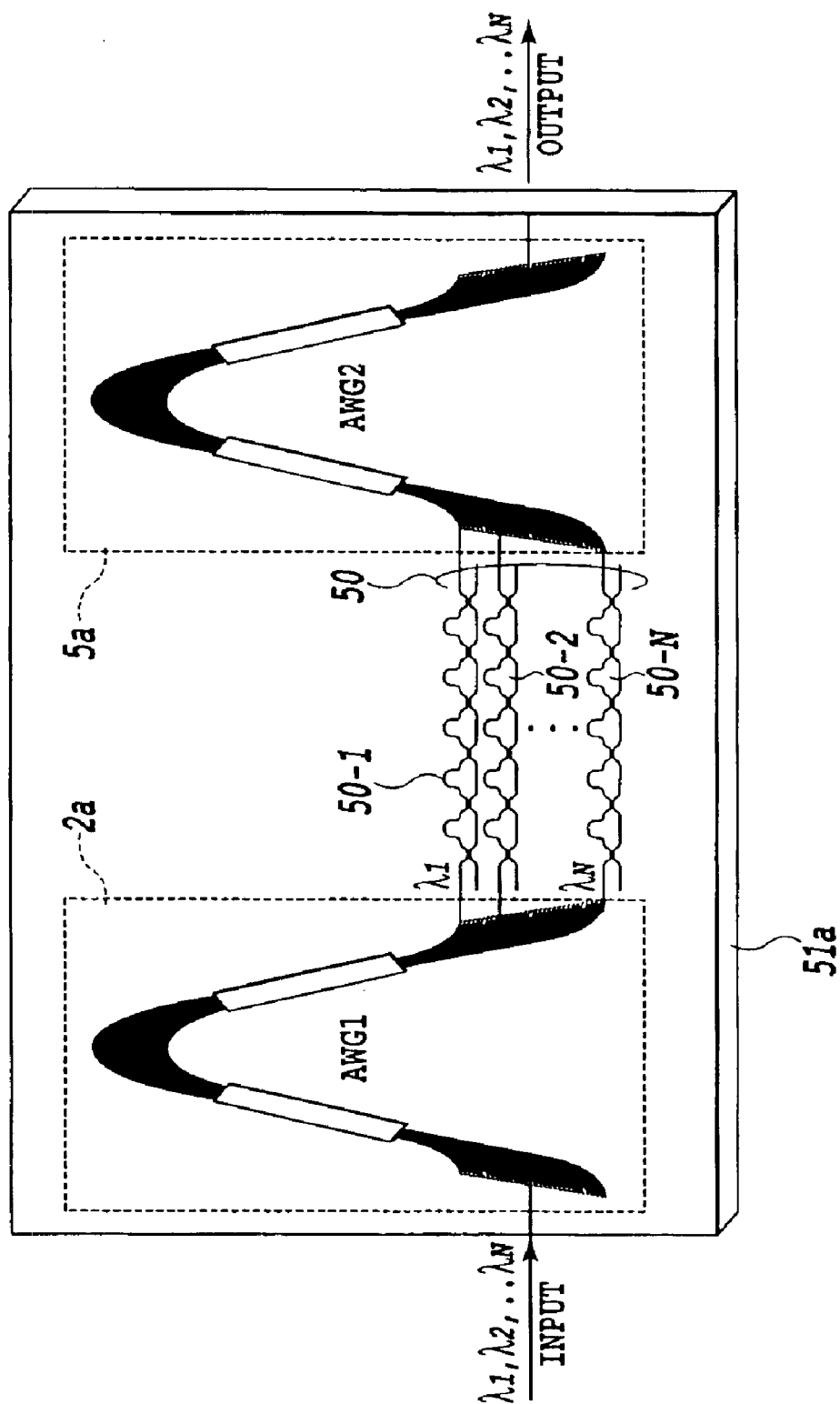
FIG. 11 is a diagram showing a configuration in which the wavelength demultiplexer and multiplexer of the dispersion slope equalizer in FIG. 1 are composed of arrayed-waveguide gratings and all components of the dispersion slope equalizer are monolithically integrated on one substrate.

FIG. 11 is a diagram showing a configuration in which the wavelength demultiplexer and multiplexer of the dispersion slope equalizer in FIG. 1 are composed of arrayed-waveguide gratings and all components are monolithically integrated on one substrate. First arrayed-waveguide grating demultiplexer 2a (AWG 1), second arrayed-waveguide grating multiplexer 5a (AWG 2) and an array of lattice-form optical circuits 50 (50-1 to 50-N) are integrated on a substrate 51a.

By monolithically integrating all components on one substrate as shown in FIG. 11, uniformity of waveguide parameters are improved, and thus control of waveguide refractive index or the like become easy. Further, production process and packaging of the device are made easy, and the device size is reduced. On the other hand, it is possible to connect separately prepared substrate (s) with lattice-form optical circuit(s) to arrayed-waveguide gratings using an optical fiber or the like.

Figure 12:
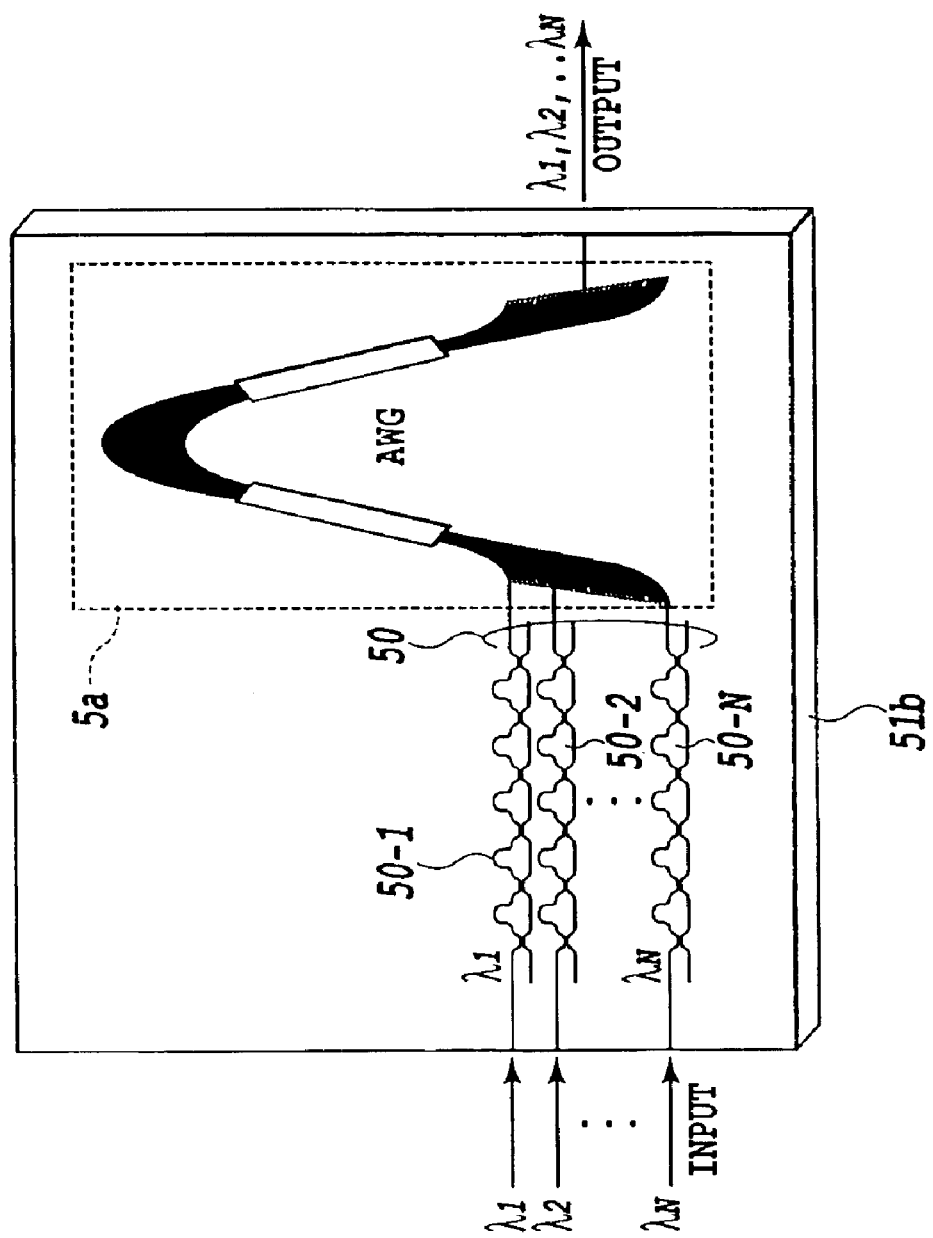
FIG. 12 is a diagram showing a configuration in which the wavelength multiplexer of the dispersion slope equalizer in FIG. 7 is composed of an arrayed-waveguide grating and all components of the dispersion slope equalizer are monolithically integrated on one substrate.

FIG. 12 is a diagram showing a configuration in which the wavelength multiplexer of the dispersion slope equalizer in FIG. 7 is composed of an arrayed-waveguide grating and all components are monolithically integrated on one substrate. An arrayed-waveguide grating multiplexer 5a (AWG) and an array of the lattice-form optical circuits 50 (50-1 to 50-N) are integrated on one substrate 51b. The configuration in FIG. 12 is used when the dispersion slope equalizer is set in front of the transmission line. In this case, various wavelength signals from the transmitters are pre-dispersion slope compensated by the lattice-form optical circuits, and are transmitted into the fiber after wavelength multiplexing at the arrayed-waveguide grating 5a. Therefore, the arrayed-waveguide grating demultiplexer 2a can be omitted in FIG. 12. Also in this case, by monolithically integrating all components on one substrate as shown in FIG. 12, uniformity of waveguide parameters are improved, and thus control of waveguide refractive index or the like become easy.

Figure 13:
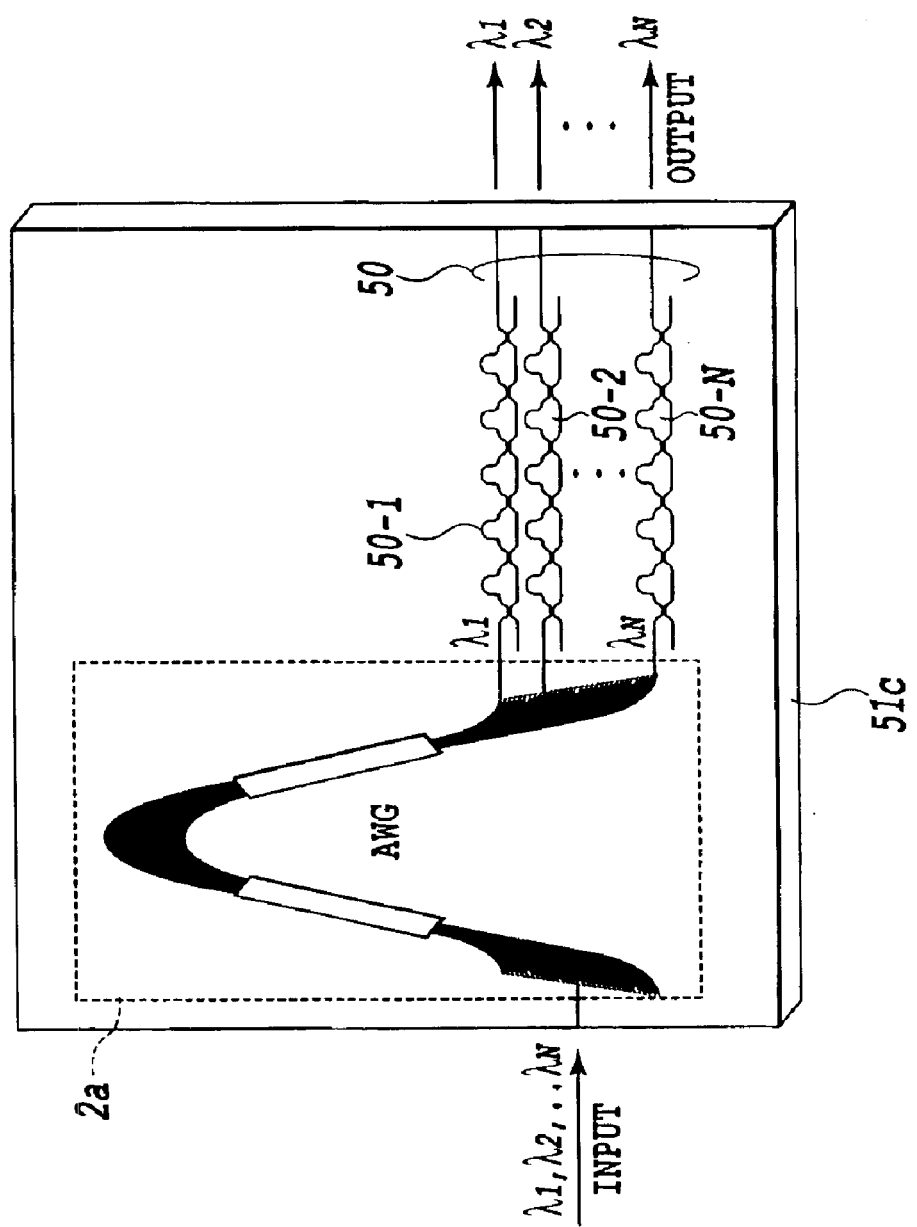
FIG. 13 is a diagram showing a configuration in which the wavelength demultiplexer of the dispersion slope equalizer in FIG. 8 is composed of an arrayed-waveguide grating and all components of the dispersion slope equalizer are monolithically integrated on one substrate.

FIG. 13 is a diagram showing a configuration in which the wavelength demultiplexer of the dispersion slope equalizer in FIG. 8 is composed of an arrayed-waveguide grating and all components are monolithically integrated on one substrate. First arrayed-waveguide grating demultiplexer 2a (AWG) and an array of the lattice-form optical circuits 50 (50-1 to 50-N) are integrated on the substrate 51c. The configuration in FIG. 13 is used when the dispersion slope equalizer is set behind the transmission line. In this case, it is not necessary to multiplex demultiplexed signals again. Therefore, the arrayed-waveguide grating multiplexer 5a can be omitted in FIG. 13. Also in this case, by monolithically integrating all components on one substrate as shown in FIG. 13, uniformity of waveguide parameters are improved, and thus control of waveguide refractive index or the like become easy.

In the embodiments in FIGS. 11 to FIG. 13, a case, where only an array of the lattice-form optical circuits is used as the dispersion slope equalizer, is described. Also, an array of the transversal-form optical circuits and the combination of the lattice-form and transversal-form optical circuits can be used as the dispersion slope equalizer.

(Third Embodiment)

Figure 14:
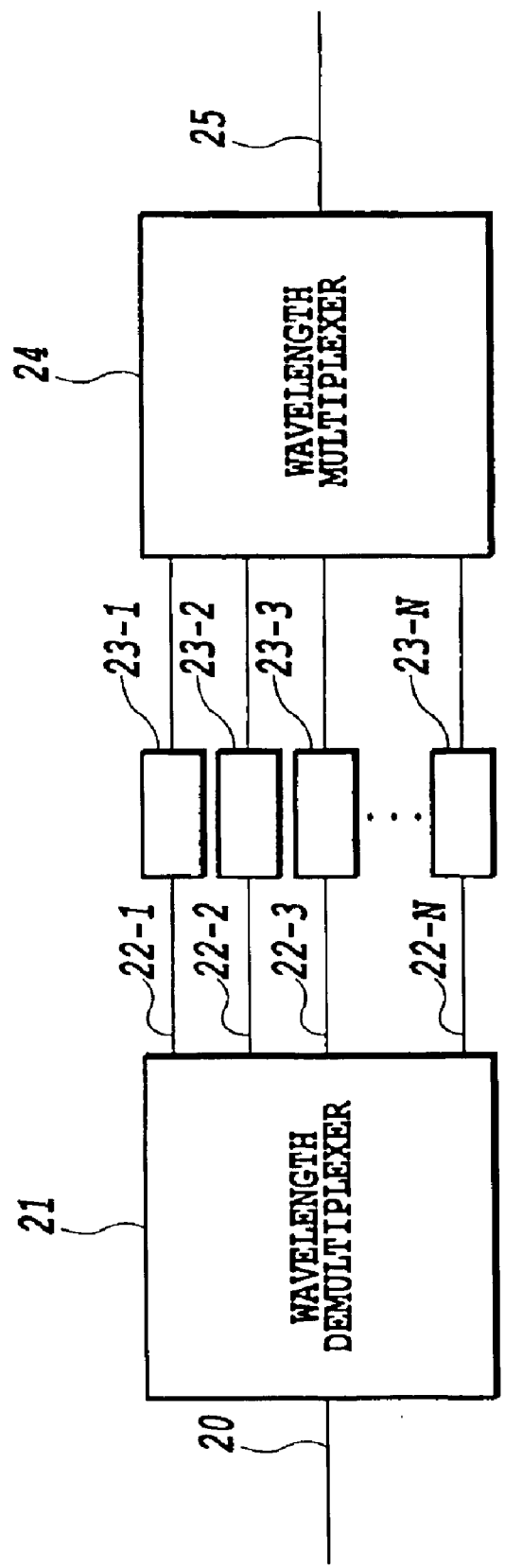
FIG. 14 is a diagram showing the configuration of a third embodiment of the dispersion slope equalizer according to the present invention.

FIG. 14 is a diagram showing the configuration of a third embodiment of the dispersion slope equalizer according to the present invention.

In FIG. 14, the dispersion slope equalizer of the present embodiment comprises an input waveguide 20, a wavelength demultiplexer 21, waveguides 22-1 to 22-N, transversal-form optical circuits 23-1 to 23-N, a wavelength multiplexer 24, and an output waveguide 25.

Figure 15:
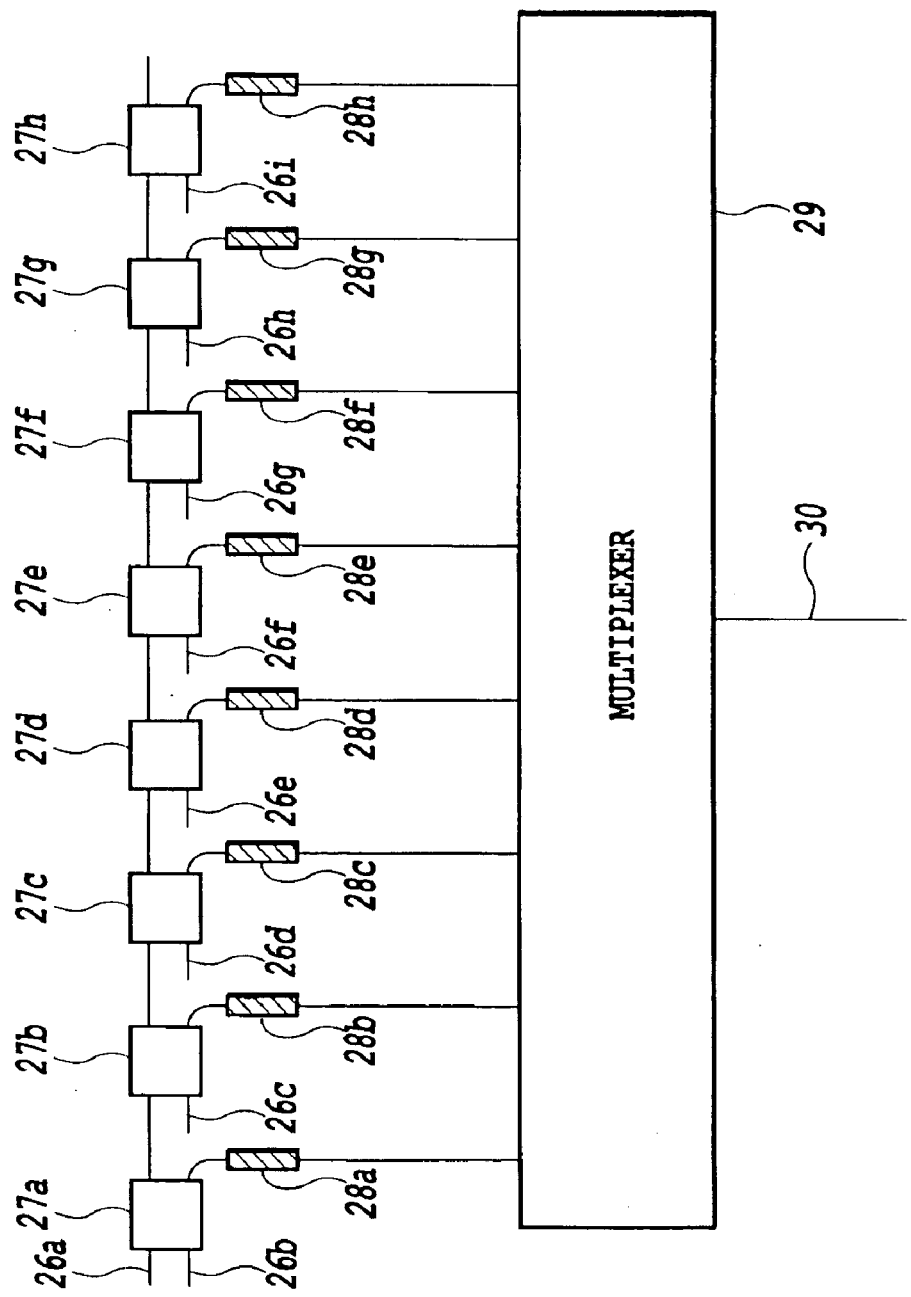
FIG. 15 is a diagram showing a configuration example of the transversal-form optical circuit shown in FIG. 14.

FIG. 15 is a diagram showing a configuration example of the transversal-form optical circuits 23-1 to 23-N.

The transversal-form optical circuits 23-1 to 23-N have the following configuration. The lightwaves are introduced into the input waveguide 26a or 26b, and then are tapped at eight taps 27a to 27h, and are finally multiplexed again by the multiplexer 29 into the output waveguide 30. Numerals 26a to 26i and 28a to 28h are waveguides and waveguide control parts of refractive index, respectively. One of the waveguides 26a and 26b and the output waveguide 30 are connected to one of the waveguides 22-1 to 22-N in FIG. 14.

Figure 3:
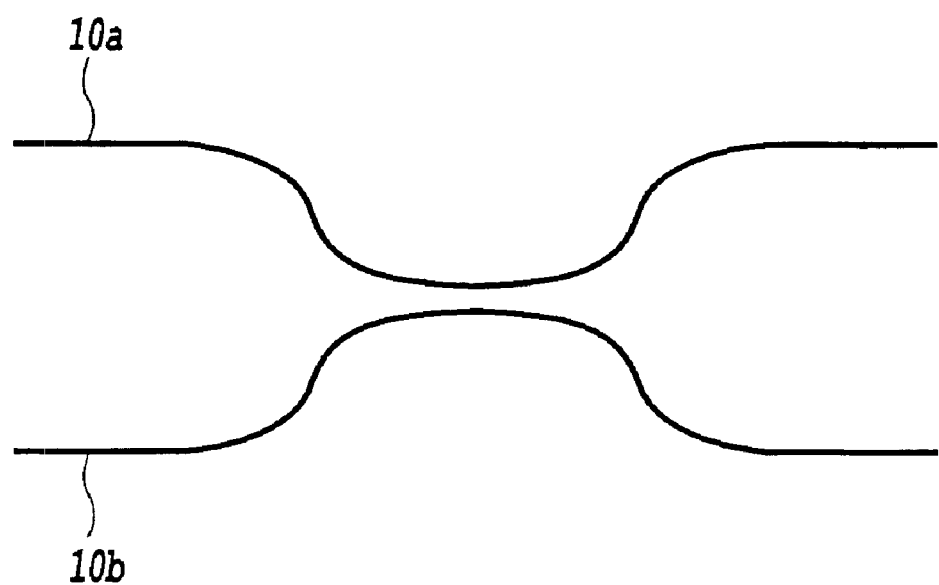
FIG. 3 is a diagram showing a configuration example of a directional coupler shown in FIG. 2.

Directional couplers shown in FIG. 3, MMI-type couplers or directional couplers shown in FIG. 5 can be used as taps 27a to 27h. Star coupler, an MMI-type coupler, 2×2 directional couplers cascaded in series, or Y-branching waveguides cascaded in series can be used as the multiplexer 29.

In FIG. 15, by appropriately tuning the coupling coefficient of the taps 27a to 27h and the waveguide phase in the control parts of waveguide refractive index 28a to 28h, the characteristic between the waveguide 26a and the output waveguide 30 or between the waveguide 26b and the output waveguide 30, the group delay time can be approximated by an arbitrary shape function with respect to an optional frequency (see, for example, K. Sasayama et al., "Coherent optical transversal filter using silica-based waveguides for high-speed signal processing," Journal of Lightwave Technology, vol. 9, no. 10, pp. 1225–1230, October 1991). Therefore, it is also possible to obtain the characteristics in FIGS. 4 and 6 by using the configuration in the present embodiment.

Therefore, dispersion slope compensation for WDM signals is also possible by using the configuration in FIG. 14.

It is possible, by the single and compact equalizer configuration in the present embodiment, to adaptively compensate for the dispersion of various fiber transmission lines having various dispersion values and variation of dispersion value caused by the temperature change or the like.

Also as described before, when a glass waveguide is used, semipermanent phase shift can be achieved without electrical power, by carrying out a local heating and quenching with high electrical power for a photoelastic effect. Thus, dispersion compensation can be achieved without electrical power using the configuration in FIG. 14.

Figure 16:
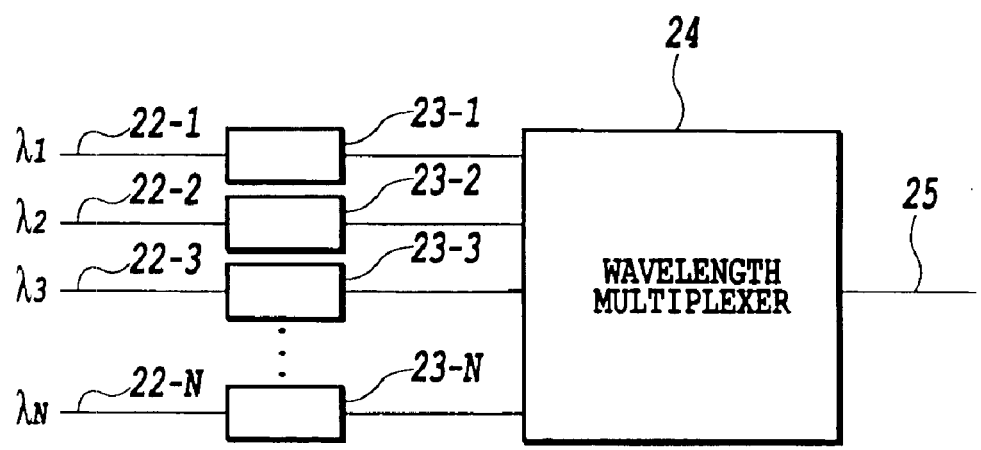
FIG. 16 is a diagram for explaining a case where the dispersion slope equalizer is set in front of a transmission line.

The configuration of the present embodiment in FIG. 14 can be used for the in-line dispersion slope equalizer. When the dispersion slope equalizer is set in front of the transmission line, it is not necessary to demultiplex the wavelength division multiplexed signals. In this case, various wavelength signals modulated by the data patterns are introduced into the waveguides 22-1 to 22-N, and are transmitted into the fiber after pre-dispersion slope compensation and wavelength multiplexing. Therefore, in such an application, the wavelength demultiplexer 21 can be omitted in FIG. 16.

Figure 17:
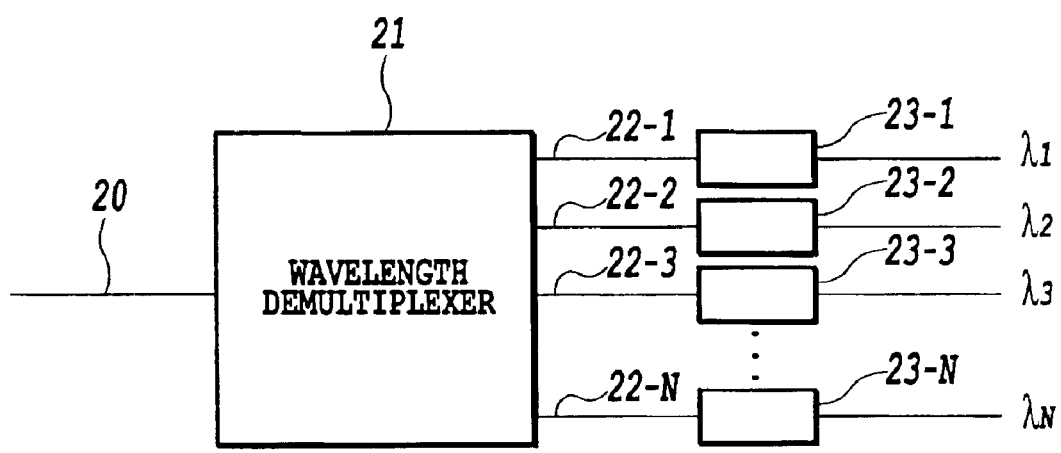
FIG. 17 is a diagram for explaining a case where the dispersion slope equalizer is set behind a transmission line.

On the other hand, when the dispersion slope equalizer is set behind the transmission line, it is not necessary to multiplex demultiplexed signals again. In this case, photo detectors are connected to just behind the transversal-form optical circuits 23-1 to 23-N. Therefore, in such an application, the wavelength multiplexer 24 can be omitted in FIG. 17.

(Fourth Embodiment)

Figure 18:
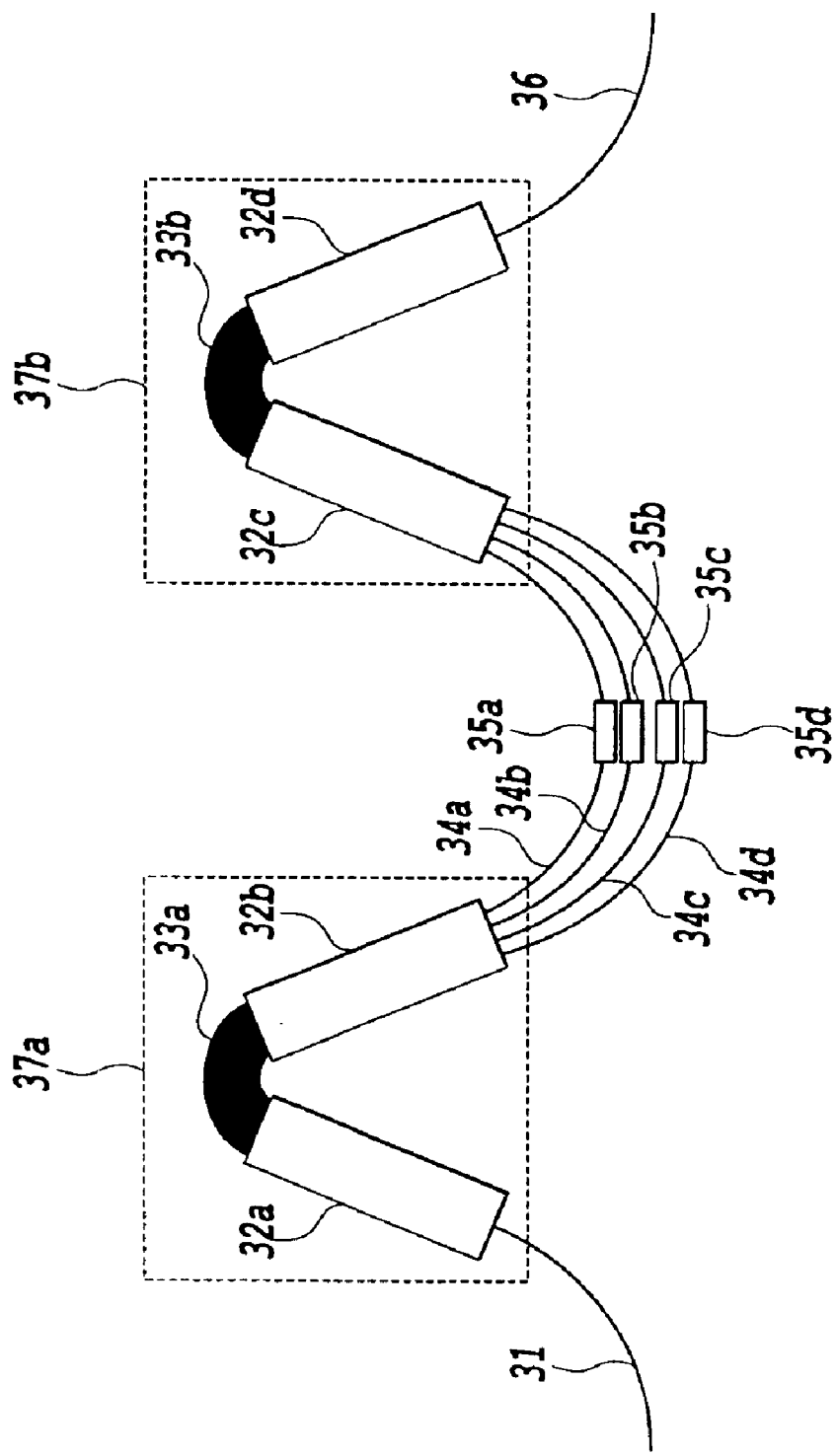
FIG. 18 is a diagram showing the configuration of a fourth embodiment of the dispersion slope equalizer according to the present invention.

FIG. 18 is a diagram showing the configuration of a fourth embodiment of the dispersion slope equalizer according to the present invention.

In FIG. 18, the dispersion slope equalizer of the present embodiment comprises an input waveguide 31, arrayed-waveguide gratings 37a and 37b, waveguides 34a to 34d, lattice-form or transversal-form optical circuits, or the like 35a to 35d, and an output waveguide 36. The arrayed-waveguide gratings 37a and 37b comprise slab waveguides 32a to 32d and arrayed-waveguides 33a and 33b.

The configuration of FIG. 18 shows a case where the wavelength demultiplexers 2, 15, and 21 and the wavelength multiplexers 5, 18, and 24 of the dispersion slope equalizer in FIGS. 1, 9 and 14 are composed of arrayed-waveguide gratings. Here, by replacing elements 35a to 35d with the lattice-form optical circuits in FIG. 2, the transversal-form optical circuits in FIG. 15, or the combination of these two circuits, a perfectly integrated dispersion slope equalizer can be achieved.

Figure 19:
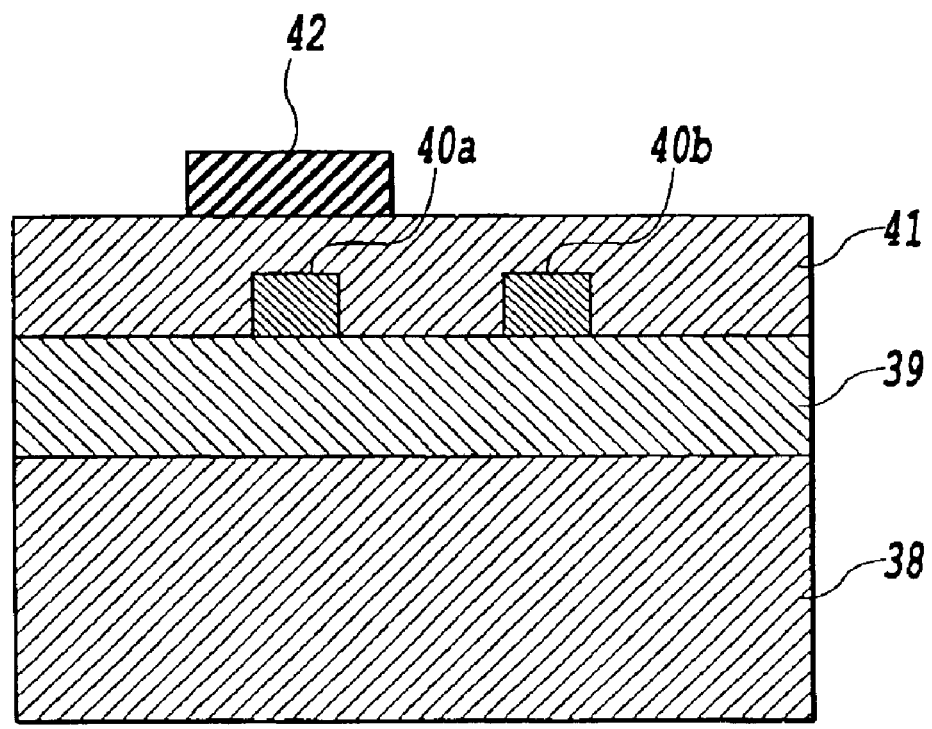
FIG. 19 is a diagram showing the sectional structure of a silica glass waveguide used in the first to fourth embodiments.
Figure 20:
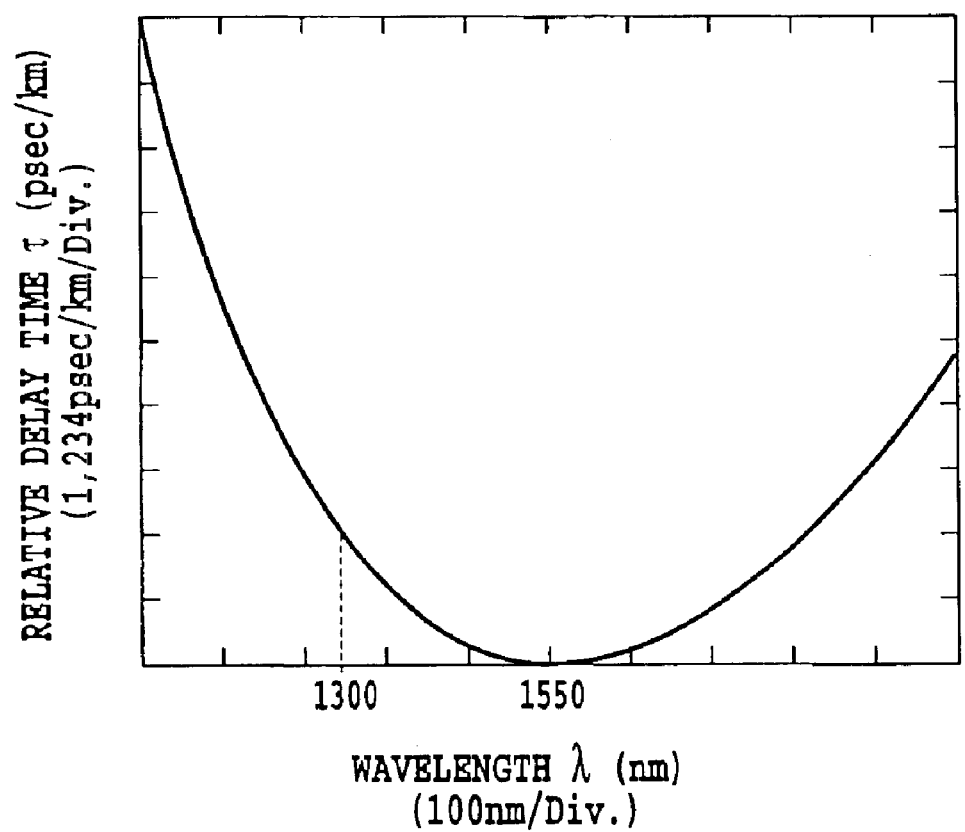
FIG. 20 is a diagram showing an example of group delay characteristic of an optical fiber.
Figure 21:
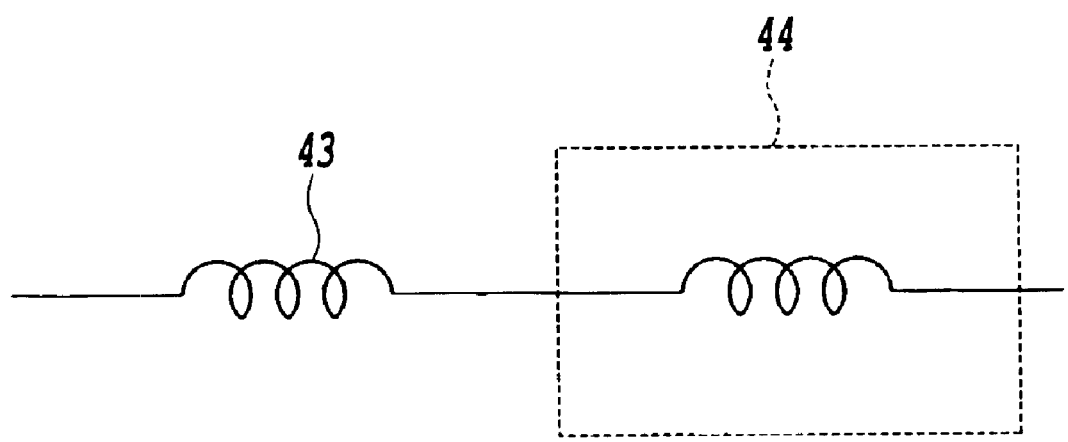
FIG. 21 is a diagram showing a configuration example of a prior art dispersion slope equalizer.

The waveguides of the dispersion slope equalizer in the foregoing embodiments according to the present invention can be formed by using silica glass waveguides 40a and 40b as shown in FIG. 19.

FIG. 19 is a sectional diagram of the waveguide, and a waveguide fabrication procedure in first to fourth embodiments will be described by referring to the drawing.

First, a $SiO_2$ under cladding layer 39 is deposited on a Si substrate 38 by a flame hydrolysis deposition method. Next, after a $SiO_2$ glass core layer mixed with dopant $GeO_2$ is deposited on the $SiO_2$ under cladding layer 39, consolidation is carried out using an electrical furnace.

Then, by etching the core layer using patterns shown in FIGS. 1 to 3, FIG. 5, FIGS. 7 to 9, and FIGS. 11 to 18, cores (silica waveguide) 40a and 40b are formed.

Next, a $SiO_2$ upper cladding layer 41 is deposited again on the $SiO_2$ under cladding layer 39 on which the cores 40a and 40b are formed, and consolidation is carried out again by the electrical furnace. Finally, thin film heaters 42 and metal interconnection are formed on some optical waveguides by an evaporation.

In the dispersion slope equalizers in first to fourth embodiments whose waveguides are formed by the forego-ing method, the thin film heaters 42 can be used to carry out phase control of waveguides by thermo-optic effect.

The waveguides forming the dispersion slope equalizer according to the present invention are not restricted to the glass waveguides, and it is obvious that dielectric waveguides, semiconductor waveguides, polymer waveguides, and optical fibers or the like can be applicable to the equalizer. Further, it is also obvious that the equalizer can be realized by hybrid-integrating several types of waveguides.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A dispersion slope equalizer for compensating signal distortion caused by dispersion slope of a transmission line when transmitting lightwaves with plural wavelength signals in the transmission line, comprising:

N (N: natural number) waveguides, N output wavelength demultiplexer and/or N input wavelength multiplexer, and K (K: natural number, K<N) group delay controllers;

said N waveguides being connected to outputs of said wavelength demultiplexer and/or inputs of said wavelength multiplexer;

in said group delay controllers, one or both of input/output parts of lattice-form optical circuits being set on said N waveguides;

said lattice-form optical circuits having two waveguides interleaved with at least two directional couplers; and said two waveguides being designed so that optical path lengths between said directional couplers are different;

wherein control parts of waveguide refractive index for effecting phase control of said waveguides are provided between respective ones of said directional couplers and in respective ones of said directional couplers, or between respective ones of said directional couplers, and semipermanent phase shift is achieved by applying local heating and quenching for a photoelastic effect to said control parts of waveguide refractive index.

2. The dispersion slope equalizer as claimed in claim 1, wherein said wavelength demultiplexer and said wavelength multiplexer are arrayed-waveguide gratings.

3. The dispersion slope equalizer as claimed in claim 1, wherein said group delay controllers are connected to N input wavelength multiplexer and said N waveguides are connected to only inputs of said wavelength multiplexer.

4. The dispersion slope equalizer as claimed in claim 3, wherein said wavelength multiplexer is an arrayed-waveguide grating.

5. The dispersion slope equalizer as claimed in claim 1, wherein said group delay controllers are connected to N output wavelength demultiplexer and said N waveguides are connected to only outputs of said wavelength demultiplexer.

6. The dispersion slope equalizer as claimed in claim 5, wherein said wavelength demultiplexer is an arrayed-waveguide grating.

7. A dispersion slope equalizer for compensating signal distortion caused by dispersion slope of a transmission line when transmitting lightwaves with plural wavelength signals in the transmission line comprising:

N (N: natural number) waveguides;

at least one of an N output wavelength demultiplexer or an N input wavelength multiplexer, wherein said N waveguides are coupled to at least one of one or more outputs of said wavelength demultiplexer or one or more inputs of said wavelength multiplexer; and K (K: natural number, K<N) group delay controllers comprising lattice-form optical circuits, wherein at least one of an input part or an output part of said lattice-form optical circuits are connected to said N waveguides;

said lattice-form optical circuits having at least two waveguides interleaved with at least two directional couplers; and said at least two waveguides have different optical path lengths between said at least two directional couplers;

wherein control parts of waveguide refractive index for effecting phase control of said waveguides are provided between respective ones of said directional couplers, or between respective ones of said directional couplers and in respective ones of said directional couplers, and semipermanent phase shift is achieved by applying local heating and quenching for photoelastic effect to said control parts of waveguide refractive index.

8. The dispersion slope equalizer of claim 7, wherein said at least one of said wavelength demultiplexer or said wavelength multiplexer comprises arrayed-waveguide gratings.

9. The dispersion slope equalizer of claim 7, wherein said group delay controllers are connected to said wavelength multiplexer, and said N waveguides are connected to said input part of said wavelength multiplexer.

10. The dispersion slope equalizer of claim 9, wherein said wavelength multiplexer comprises an arrayed-waveguide grating.

11. The dispersion slope equalizer of claim 7, wherein said group delay controllers are connected to said output wavelength demultiplexer, and said N waveguides are connected to said output part of said wavelength demultiplexer.

12. The dispersion slope equalizer of claim 11, wherein said at least one wavelength demultiplexer comprises an arrayed-waveguide grating.

* * * * *